United States Patent [19]
Brown

[11] 3,770,872
[45] Nov. 6, 1973

[54] ELECTRICAL OUTLET BOX CONSTRUCTION

[75] Inventor: Leland A. Brown, Huntington Station, N.Y.

[73] Assignee: Electrical Fittings Corp., East Farmdale, N.Y.

[22] Filed: Nov. 17, 1971

[21] Appl. No.: 199,581

[52] U.S. Cl. .................................. 174/53, 29/509
[51] Int. Cl. ............................................ H02g 3/08
[58] Field of Search ........................ 174/53; 29/509

[56] References Cited
UNITED STATES PATENTS
3,304,363  2/1967  Zerwes .............................. 174/53
3,340,349  9/1967  Zerwes .............................. 174/53

Primary Examiner—Bernard A. Gilheany
Assistant Examiner—D. A. Tone
Attorney—Howard C. Miskin

[57] ABSTRACT

An electrical outlet box is cast of aluminum or other soft metal and has grooved tracks formed on the top and bottom inside faces of its side walls and the medial inside faces of the top and bottom end walls. One form of mounting bracket includes a front mounting plate and three rearwardly projecting tongues which slideably engage the track grooves and are locked in position by shearing portions of the groove side walls and bending them into engagement with shoulders on the tongues. The mounting plate has an opening for guiding a tool to the groove wall front face. In another form the bracket includes a medial stepped tongue providing a vertical shoulder and the groove side walls are deformed to engage the shoulder edges and a top face of the tongue outer stepped portion.

12 Claims, 8 Drawing Figures

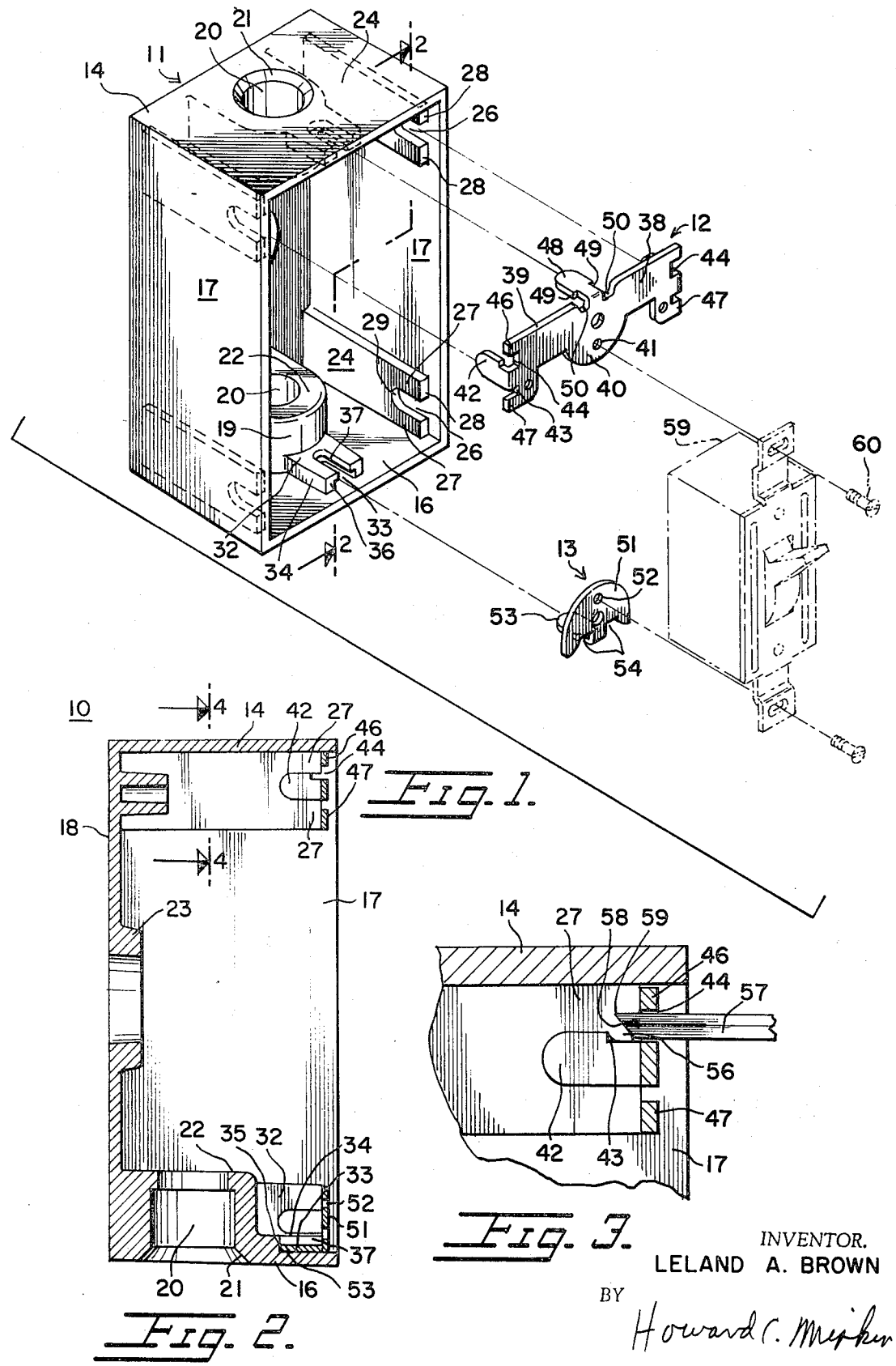

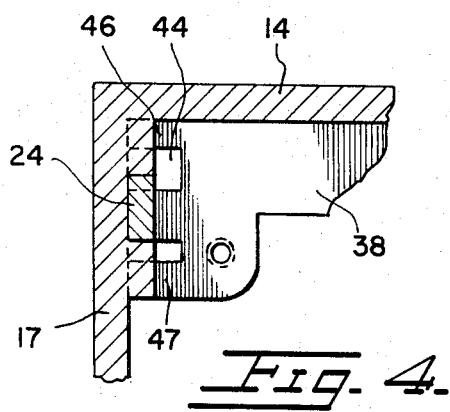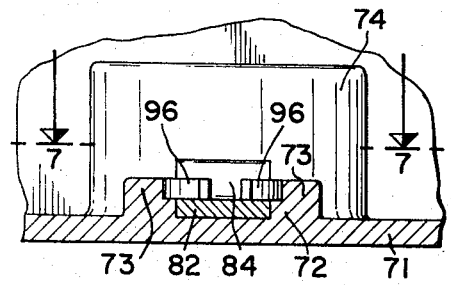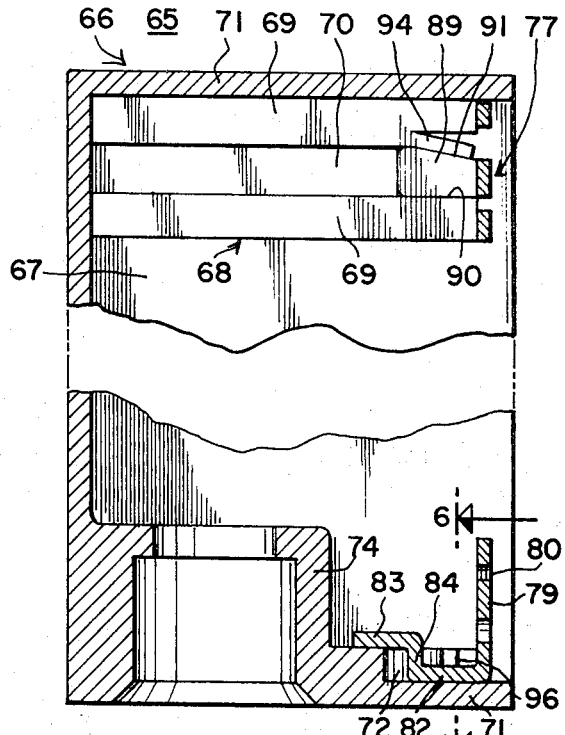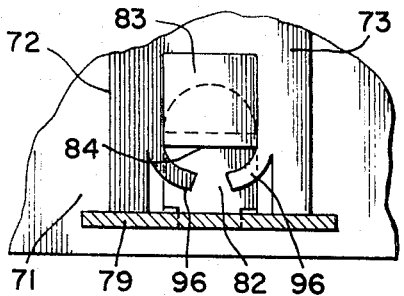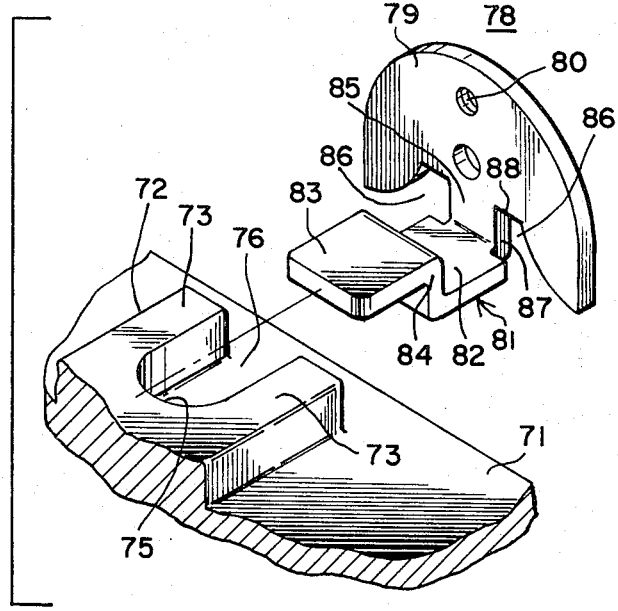

ELECTRICAL OUTLET BOX CONSTRUCTION

BACKGROUND OF THE INVENTION

The present invention relates generally to improvements in electrical hardware and it relates more particularly to an improved electrical junction or outlet box.

The conventional electrical junction or outlet box, particularly those which are for outdoor use of for use in highly humid and corrosive surroundings generally include a box which is die cast of aluminum or a suitable soft alloy and is provided with fastening means for the reception and securement of various electrical fixtures, such as switches, outlet sockets and the like. These electrical boxes are complex and expensive structures, which are difficult to fabricate and use and are of little flexibility and adaptability. Normally, such boxes have integral posts die cast at opposite ends of the box, and having threaded holes formed in them, by drilling and tapping. Since these posts are fixed, there is little flexibility in attaching switches and the like to the box. Various electrical box structures have been proposed to overcome the drawbacks of the conventional electrical junction and outlet boxes, but the proposed structures possess many of the disadvantages of the earlier structures being of little flexibility, requiring a high degree of skill to employ and utilize and being awkward, heavy, and expensive and otherwise leaving much to be desired.

SUMMARY OF THE INVENTION

It is a principal object of the present invention to provide an improved electrical outlet box or the like.

Another object of the present invention is to provide an improved weatherproof and moisture-proof electrical outlet box.

Still another object of the present invention is to provide an improved electrical outlet box of the cast metal type provided with mounting brackets for switches, outlet sockets and the like which are simply and firmly positioned and secured in the cast box.

A further object of the present invention is to provide an improved outlet or junction box, which allows moutning various types of separately formed plates or brackets permanently to the box to allow the box to serve various needs, such as standard or universal types of junction boxes.

A still further object of the present invention is to provide an improved article of the above nature characterized by its ruggedness, reliability, low cost, ease of fabrication, assembly and use, simplicite of casting, high versatility and adaptability.

The above and other objects of the present invention will become apparent from a reading of the following description taken in conjunction with the accompanying drawings which illustrate preferred embodiments thereof.

In a sense the present invention contemplates the provision of an electrical outlet box structure comprising a box member having an open front and peripheral horizontal top and bottom end walls, vertical side walls and a base, and provided with at least one conductor access opening, a first track integrally formed on the inner face of one of the walls and extending rearwardly from the forward part of the box toward the base and including a pair of transversely spaced walls delineating a track groove open at its forward end, and a mounting bracket including a front vertically extending mounting section registering with the box front opening and a rearwardly projecting first coupling tongue engaging the track groove and provided with a rearwardly directed shoulder disposed rearwardly of the front end of a first of said track walls.

The preferred form of the outlet box includes tracks formed on the side wall inside faces adjacent to the top and bottom end walls to define laterally aligned upper and lower pairs of tracks and tracks medially formed on the inside faces of the top and bottom end walls. One form of bracket includes a transverse vertical mounting plate or strap having coupling tongues at opposite ends projecting rearwardly toward the bottom into engagement with a corresponding pair of side track grooves, each of the tongues having a forwardly facing shoulder located in a corresponding groove. Openings are formed in the mounting plate adjacent to the tongue and an angular faced tool is inserted through each opening to shear a forward portion of the track bordering the track groove and deforming it into engagement with a respective tongue shoulder. Another coupling tongue is medially formed along the mounting strap longitudinal edge and engages an end wall track and is provided with opposite forwardly directed shoulders which are engaged by sheared, deformed sections of the track walls. Another form of bracket is shorter than that described above and includes only one coupling tongue which is in locking engagement with an end wall track. The medial coupling tongue may be stepped to provide a forwardly facing shoulder between the step portions which is engaged by the sheared deformed track sections.

The improved electrical outlet box is easily and inexpensively produced by conventional die casting procedures, is rugged, simple, easy to assemble and use, and of great versatility and adaptability.

BRIEF DESCRIPTION OF THE DRAWINGS

FIG. 1 is an exploded perspective view of an outlet box embodying the present invention, a switch for attachment thereto being shown in broken line;

FIG. 2 is a sectional view taken along line 2—2 in FIG. 1, in the unlocked assembled condition of the outlet box;

FIG. 3 is an enlarged fragmentary view of FIG. 2 illustrating the assembly locking procedure;

FIG. 4 is an enlarged sectional view taken along line 4—4 in FIG. 2;

FIG. 5 is a fragmentary vertical longitudinal sectional view of another embodiment of the present invention.

FIG. 6 is a sectional view taken along line 6—6 in FIG. 5;

FIG. 7 is a sectional view taken along line 7—7 in FIG. 6; and

FIG. 8 is an enlarged fragmentary perspective exploded view of the second embodiment of the bottom track and bracket.

DESCRIPTION OF THE PREFERRED EMBODIMENT

Referring now to the drawings, particularly FIGS. 1 to 4 thereof which illustrate a preferred embodiment of the present invention, the reference numeral 10 generally designates the improved electrical outlet box structure which includes a box 11 and top and bottom mounting brackets 12 and 13 respectively. The reference to "top" and "bottom " refers to the structure as viewed in FIG. 1. The box 10 is formed of a shearable deformable material such as aluminum, aluminum alloys and other suitable soft metals and is advantageously die cast. The box 10 is of conventional shape and includes rectangular top and bottom end walls 14 and 16 respectively, rectangular side walls 17 and a rectangular base or rear wall 18 and is open at its front and symmetrical to a medial horizontal plane and a medial longitudinal vertical plane. Formed on the inside faces of top and bottom walls 14 and 16 proximate rear wall 18 are inwardly projecting vertical bosses 19 which join rear wall 18 and are provided with bores 20. The bores 20 are chamfered at their outer edges, as at 21, and are provided at their inner edges with peripheral lips 22, the bores 20 being for the accomodation and engagement of conduits and may be threaded. An inwardly projecting conduit accomodating axially pored boss 23 is centrally formed on the inside face of rear wall 18.

Integrally formed with each side wall 17 adjacent to the top and bottom walls 14 and 16 are flat rectangular bars 24 which extend from points shortly rearwardly of the box front opening to rear wall 18. The forward portion of each bar 24 is recessed to form a longitudinally extending track or groove 26 which is open at its front and is delineated by vertically spaced parallel legs or side walls 27 having vertical coplanar front faces 28 which are coplanar with the front faces of the other track walls. The base of groove 26 is coplanar with the inside face of side wall 17 and the longitudinal confronting faces of groove 26 are horizontal and parallel and are joined at their rears by an arcuate groove inner face 29.

Medially located on the inside face of each of the end walls 14 and 16 and integrally formed therewith is a flat block 32 which extends from the plane of block faces 28 to a corresponding boss 19. A track defining groove 33 is medially formed in each block 32 and is similar in shape to grooves 26, extending substantially to the boss 19, the groove 33 being delineated by side legs or walls 34 terminating in flat front faces 36. An inwardly directed lip 37 is formed along the full inner periphery of groove 33. The base of groove 33 is coplanar with the inside face of corresponding wall 14 or 16 and the longitudinally confronting faces of groove 33 are parallel and are joined at their rears by an arcuate groove inner face 35.

The first mounting bracket 12 includes a transversely extending vertical mounting plate or strap 38 having a horizontal top edge 39 and a downwardly enlarged medial section 40 provided with a tapped bore 41. Integrally formed with and projecting rearwardly from opposite ends of plate 38 are a pair of coupling tongues 42 of a shape mating with the coupling grooves 26 and being positioned a distance from plate edge 38 equal to that between grooves 26 and the inside faces of adjacent end walls 14 and 16 respectively. A notch is formed in the forward outer sections of each tongue 42 to provide vertical forwardly facing shoulders 43 whose distance from the free end of the tongue 42 is less than the length of a groove 26. A rectangular tool guide aperture 44 is formed in each end of plate 38 adjacent to and extending above the notched portion of the coupling tongue 42 and is of a height about half the width of track wall 27. The bottom edge of aperture 44 is coplanar with the bottom edge of the cutout portion of tongue 42 and the top edge is delineated by a stop lug 46. A second stop lug 47 coplanar with a respective stop lug 46 and plate 48 is positioned below the bottom edge of each tongue 42.

Medially rearwardly projecting from the upper or top edge 39 of plate 38 is a coupling tongue 48 corresponding in shape to a track groove 33 below lips 37 and there is provided fordwardly of the rearward end of the tongue 48 a pair of oppositely disposed forwardly facing shoulders 49. A pair of tool guide slots 50 are formed in the plate top edge 39 on opposite sides of tongue 48 and are of widths about half that of track walls 34. The inner edges of slots 50 are vertical and coplanar with the front inwardly offset side edges of tongue 48.

The mounting bracket 13 is similar in construction to the medial section of mounting bracket 12 and includes a vertical semicircular plate 51 having a tapped bore 52 and provided along its horizontal bottom edge with a forwardly projecting coupling tongue 53 similar in configuration to tongue 48. Like tongue 48, coupling tongue 53 is of lesser width at its forward end to provide forwardly directed shoulders corresponding to shoulders 49 and a pair of tool guide rectangular slots 54 are formed in the horizontal bottom edge of plate 51 on opposite sides of the reduced forward section of tongue 53 and are of widths about half that of track walls 34.

In assembling the box 11 and brackets 12 and 13 in an interlocked condition, the upper bracket 12 is applied by sliding the tongues 42 and 48 into full engagement with grooves 26 and 33 respectively until lugs 46 and 47 abut wall faces 28 and by similarly sliding tongue 53 of lower bracket 13 into lower groove 33.

The bracket 12 is firmly locked in position by shearing track walls 27 of bars 24 along medial horizontal planes and deforming the forward portions of the sheared walls to form locking ears 56 which bear on shoulders 43 and the side edges of tongues 42, and by similarly shearing and deforming the track walls 34 into engagement with shoulders 49. The wall shearing and deformation are accomplished by the use of a hardened steel tool 57 having a bevelled forward face 58 with a sharp horizontal cutting edge 59 and a rectangular transverse cross section slightly less in dimensions than guide opening 44. The tool 57 is merely inserted through guide opening 44 with its cutting edge 59 engaging face 28 and is struck sufficiently to sheer wall 27 and effect the desired deformation aided by the curved face 58 of tool 57. The track walls 34 engaging tongues 48 and 53 of brackets 12 and 13 respectively are sheered and deformed by the use of the tool 57 in a similar manner. Any conventional electrical control or coupling such as switch 59 is mounted in box 10 by securing the switch 59 to brackets 12 and 13 by screws 60 engaging corresponding tapped openings 41 and 52 in the usual manner.

in FIGS. 5 to 8 of the drawings there is illustrated another embodiment of the present invention which differs from that first described primarily in the construction of the coupling tongues and tracks. Specifically the outlet box assembly, designated as 65, includes a cast soft metal box 66, which, except for the tracks, is similar in structure to box 11. Formed on the side walls 67 of box 66 adjacent the top and bottom edges thereof are horizontal tracks 68 which extend from points inwardly of the box forward end to the rear face thereof, each track 68 including vertically spaced side walls 69 delineating a horizontal track groove 70. Medially formed on the box top and bottom end walls 71 are tracks 72 each of which includes a pair of transversely spaced side walls 73 extending rearwardly from points inside the box front face to corresponding bosses 74 and delineating a track groove 76 terminating short of boss 74 in an arcuate end face 75.

Associated with the box 66 are top and bottom brackets 77 and 78 respectively. The bottom bracket 78 includes a substantially semicircular vertical mounting plate 79 whose upper edge is arcuate and which is provided with a tapped coupling aperture 80. A stepped coupling tongue 81 medially rearwardly projects from the bottom edge of plate 79 and includes a front horizontal bottom section 82 at the level of the bottom edge of plate 79 and a rear upper horizontal end section 83 delineated from front section 82 by a vertical shoulder 84. The length of tongue front section 82 is somewhat less than that of groove 76 and the difference in the levels of sections 82 and 83 is about the height of the track walls 73.

Tool guide openings 86 are formed in the lower border of plate 79 on opposite sides of tongue 81 and delineate a vertical center arm 85 of lesser width than tongue 81 and each opening 86 has a vertical inner edge 87, a horizontal top edge 88 and outwardly curved outer edges.

The upper bracket 77 except for the coupling tongues is similar to bracket 12 described above. The medial portion of bracket 77 and the tongue section thereof are similar to bracket 78. The side ends of upper bracket 77 are provided with rearwardly horizontal projecting coupling tongues 89 having horizontal bottom edges 90 and forwardly facing top shoulders 91 which are defined by the forwardly downwardly inclined upper edges of tongues 89. In all other respects the brackets 12 and 88 are similar.

In assembling and interlocking box 66 and brackets 77 and 78, the brackets are assembled with the box with the coupling tongues 81 and 89 in engagement with respective grooves 76 and 70 and the bracket plates abutting the front faces of the track walls. Thereafter downwardly forwardly inclined ears 94 are sheared and bent from the upper track walls 69 into tight engagement with the tongue shoulders 91 by means of tool 57 as earlier described Similarly, curved locking ears 96 are sheared and formed from track walls 73 above the level of tongue section 82 by inserting a tool 57 through guide openings 86 along edges 87 and the top face of tongue section 82 with the tool edge outermost and hammering the tool. The locking ears 96 forwardly converge and overly the top face of tongue section 82 and engage the side edges of shoulder 84. The assembled outlet box 75 may now be employed in the usual manner.

While tongue 81 is shown used in combination with tracks 68, it can be used with track 26 or variations of either. Also, full length brackets could be used on both ends of boxes 10 and 65. Also, shoulders can be placed on one or both sides of the tongues, as needed.

Various other ways of deforming the track walls for cooperatively locking the tongues of the plates besides sheering can be used such as staking, splitting, swagging, or the like.

No limitations on the body size or configuration of the boxes are intended. More or less conduit opening may be used than shown.

The present invention allows easy to fabricate plates whch can be readily modified as needed. Switches and the like can be easily mounted on the plates. The plate is ruggedly attached to the box.

While there have been described and illustrated preferred embodiments of the present invention, it is apparent that numerous alterations, omissions and additions may be made without departng from the spirit thereof.

What I claim is:

1. An electrical outlet box structure comprising a box member having an open front and peripheral horizontal top and bottom end walls and vertical side walls and a base and provided with a conductor access opening, a first track integrally formed on the inner face of one of said walls and extending rearwardly toward said base from the forward part of said box and including a pair of transversely spaced walls delineating a track groove open at its forward end, a mounting bracket including a front vertically extending mounting section registering with said box front opening and a rearwardly projecting first coupling tongue engaging said track groove and provided with a forwardly directed shoulder disposed rearwardly of the front end of a first of said track walls, and means locking said tongue in said groove.

2. The structure of claim 1 wherein said bracket is provided proximate said tongue with a guide opening providing access to the front face of said wall containing said first track.

3. The structure of claim 2 wherein said guide opening is bordered by a guide edge in alignment with a transverse line between the front face of said walls defining said track groove to provide a guide surface for a track wall deforming tool.

4. The structure of claim 1 wherein said locking means comprises a longitudinally shear from the forward inside portion of said first track wall transversely deforming it into engagement with said coupling tongue shoulder.

5. The structure of claim 1 including a pair of said first tracks, each track being positioned on one of said side walls proximate a common end wall and being laterally aligned, said bracket including a pair of said first coupling tongues projecting rearwardly from opposite ends of said mounting section and engaging respectively track grooves.

6. The structure of claim 5 comprising a second track medially positioned on the underface of an end wall between said pair of first tracks and including a pair of side walls delineating a longitudinal groove open at its front end, said bracket including a medially located second coupling tongue engaging said groove in said second track.

7. The structure of claim 6 including a pair of said first tracks formed on said side wall inside faces proximate said top and bottom walls and one of said second tracks being positioned on each of said top and bottom walls.

8. The structure of claim 5 wherein said bracket is provided adjacent each of said coupling tongues with a guide opening providing access to the front face of respective track walls.

9. The structure of claim 1 wherein said track is positioned on one of said box end walls and said track walls include inwardly directed longitudinal lips along their opposite outer edges, said bracket coupling tongue underlying said lips and being provided with laterally opposite outwardly facing shoulders located within said groove.

10. The structure of claim 1 wherein said track is positioned on one of said box end walls and said coupling tongue includes vertically offset longitudinally spaced sections separated by said rearwardly facing shoulder, said shoulder being positioned in said groove.

11. The structure of claim 10 wherein the inner forward section of at least one of said track walls is longitudinally sheared and inwardly deformed into engagement with a side edge of said shoulder and the top face of said tongue forward section.

12. The structure of claim 1 wherein said shoulder extends obliquely rearwardly.

* * * * *